March 12, 1957 S. R. PETERSON 2,785,278
CONTROL FOR ELECTRICALLY HEATED DEVICES
Filed May 23, 1955 2 Sheets-Sheet 1

INVENTOR.
Stuart R. Peterson

March 12, 1957 S. R. PETERSON 2,785,278
CONTROL FOR ELECTRICALLY HEATED DEVICES
Filed May 23, 1955 2 Sheets-Sheet 2

INVENTOR.
Stuart R. Peterson

United States Patent Office 2,785,278
Patented Mar. 12, 1957

2,785,278

CONTROL FOR ELECTRICALLY HEATED DEVICES

Stuart R. Peterson, Minneapolis, Minn.

Application May 23, 1955, Serial No. 510,359

20 Claims. (Cl. 219—44)

This invention relates generally to electrically heated devices, for example those of the cooking vessel variety such as automatic coffeemakers, and pertains more particularly to a thermal control therefor.

One important object of the invention is to provide a heating circuit capable of furnishing two different degrees of heat to the object being heated with only a single heating unit. More specifically, an aim of the invention is to provide an initial "high" heat and a subsequent "low" heat by means of simplified circuitry requiring the use of a single bimetallic element having associated therewith only one pair of switch contacts which function to energize a unitary heating element. When this heating control is incorporated into an automatic coffeemaker, whether of the commonly known "percolator" or "vacuum" type, it will be appreciated that the aforementioned high heat will serve as the brewing heat and the low heat will thereafter act as the means by which the brewed coffee will be kept warm until poured.

Another object of the invention is to achieve the foregoing end, that is the elimination of a second or warming heating unit, without resorting to complex latching mechanisms or employing elaborately fabricated bimetallic elements.

A further object is to provide a vessel, the low or warming temperature of which is controlled in such a fashion that for all practical purposes the contents of such vessel will be maintained within a uniform temperature range irrespective of the original amount or the quantity remaining after portions thereof have been withdrawn.

Still further, another feature resides in the fact that the thermal control forming the subject matter of the invention allows facile reheating of the contents of a vessel without again subjecting the vessel to the high or cooking heat. Such a feature possesses especial utility in automatic coffee making, for once having brewed the coffee, the coffee may be reheated after having permitted the coffee to cool to room temperature, as would be desirable if the appliance had been electrically disconnected for awhile. In accordance with the instant invention, the reheat would be achieved without the already brewed coffee passing through a subsequent brewing cycle.

Yet another object of the invention is to obtain the aims set forth above with a minimum of parts, thereby reducing the cost of manufacturing an appliance equipped with my heating control. Specifically, as already indicated, the salient parts comprise a single heating unit and a single bimetallic element instrumental in engaging or actuating switch contacts at appropriate intervals to energize said heating unit. By energizing the heating unit intermittently, a lower or warming heat is produced. With regard to cost reduction, it may be pointed out that such an advantage is realized in a practical manner without sacrifice of safety, for should the appliance, if a vessel, be inadvertently started "dry" the thermostatic control will be accelerated through its operational cycle and will hold the vessel at a temperature approximating its preselected warming or low heat temperature even though empty.

Briefly, the invention comprehends the employment of a single bimetallic element that is affected by heat radiated from the object, the temperature of which is to be controlled. Upon sufficient deflection of the bimetallic element owing to heat so transferred, a portion of the element is automatically brought into a heat conductive relationship with the object, this bimetallic portion at the same time being arrested in its deflective movement to constrain the bimetallic element so that a different portion thereof is compelled to move in a path which causes a pair of switch contacts to open, these switch contacts being in series with the single heating element under the supervisory control of said bimetallic element. De-energization of the heating element, which has been furnishing heat to the object, allows the object to start to cool, but not completely, for the switch contacts are permitted to close before loss of the previously established heat conductive relationship between the object and the bimetallic element, and the re-energization of the heating element adds more heat to the object, thermally influencing the bimetallic element via the heat conductive path (and also by radiation) to such an extent that it will again open the switch contacts. It is the continued existence of both the radiation and conduction paths, particularly the latter, that cause the bimetallic element to cycle in a manner to reduce the temperature of the object by reason of intermittent energization of the heating unit in contradistinction to a continuous energization thereof that produced the original or high heat. By establishing a heat conductive relationship between the object and the bimetallic element when both have had an opportunity to cool, it will be appreciated that a reheat of the object can be accomplished to the extent of bringing said object to its low or warming heat condition without again passing through a second or repeated high heat period.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 3:
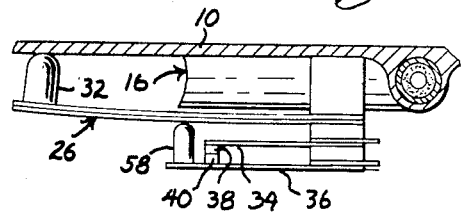
Figure 3 is an even more fragmentized view corresponding to Figure 1 but depicting a different operational position of the thermostatic element.
Figure 4:
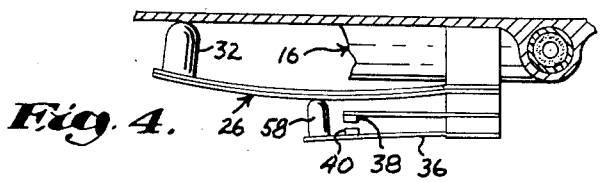
Figure 4 represents a still different operational condition than those presented in Figures 1 and 3.
Figure 6:
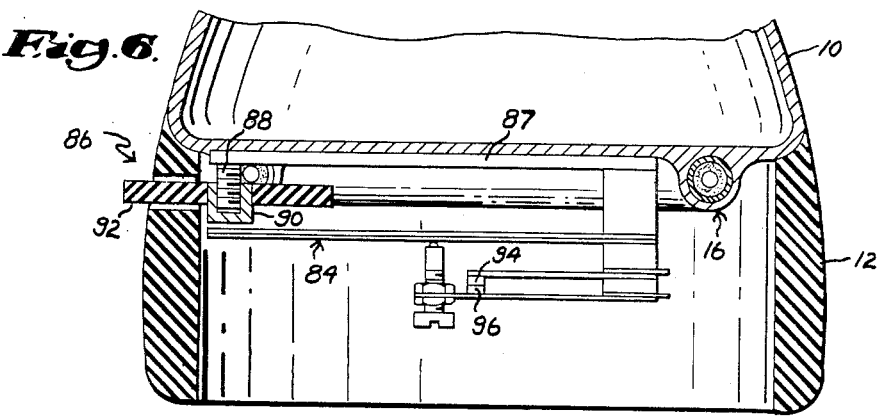
Figure 7:
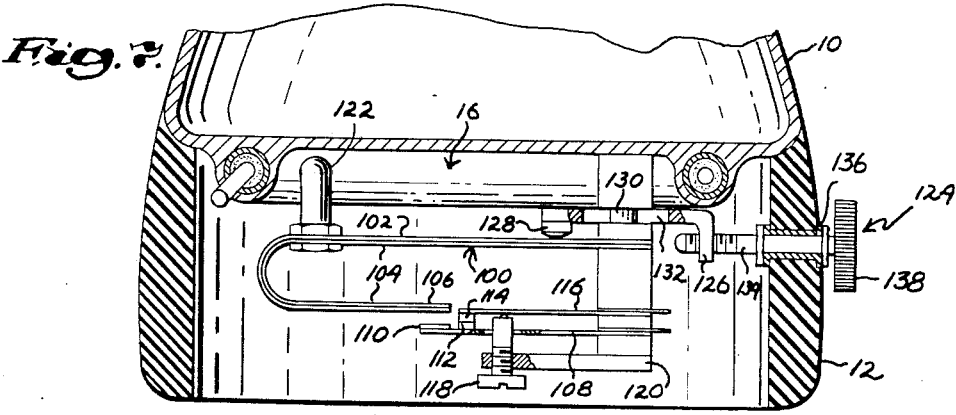
Figure 8:
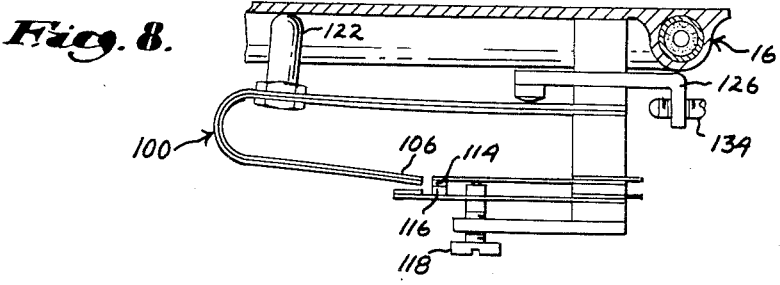
Figure 9:
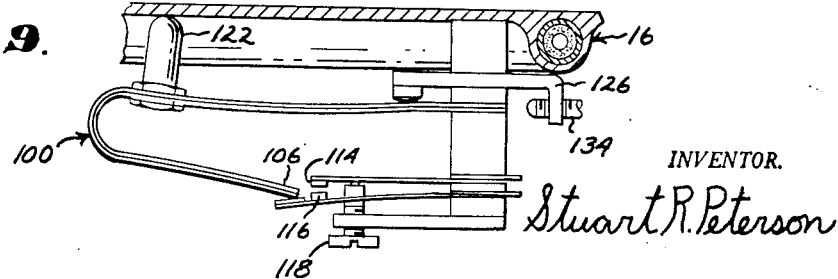

Figure 6 exemplifies another construction that the invention may assume;

Figure 7 suggests what under certain circumstances may be considered a preferred form of the invention;

Figure 8 illustrates an operational position corresponding to that of Figure 3, utilizing instead the structure of Figure 7, and Figure 9 is indicative of an operational condition corresponding to that of Figure 4, hereagain the view involving the employment of the structure of Figure 7.

Referring in detail to the drawings and for the moment to Figures 1, 2, 3 and 4, the invention is exemplified in a rather simplified form which lends itself readily to an understanding of the respective roles played by the more basic parts. To this end the invention is pictured as being associated with a vessel 10 shown only fragmentarily and which may be the lower portion of either a percolator or vacuum type of coffeemaker. At any rate the vessel 10 is the object or member to be heated, and supporting the vessel is a base 12 of appropriate insulating plastic material. In the illustrated embodiment the vessel 10 is equipped with an armored electrical heating unit designated generally by the reference numeral 16 and comprising a metal sheath 18 and a centrally disposed resistance element 20 with intermediate insulating matter 22, the unit 16 being embedded in the bottom of the vessel 10. Of course it will be appreciated that the heating unit 16 need not be of the precise construction shown, for it may assume a variety of conventional configurations. However, adoption of other types of heating units may involve relocating the thermostatic structure presently to be described relative thereto, use of a disc type, for instance, requiring that the thermostatic means be displaced to one side from the centrally disposed location in which it is now pictured.

The thermostatic structure shown in Figures 1, 2, 3 and 4 has been designated in its entirety by the numeral 24 and includes a bimetallic element 26 composed of an upper strip of metal 28 having a relatively low thermal coefficient of expansion and a lower strip 30 possessing a relatively high thermal coefficient of expansion. The bimetallic element is anchored in cantilever fashion at one end by means hereinafter referred to. At its free end, however, is carried an upstanding metallic stud 32, for most applications preferably possessing fairly good heat conductive properties such as copper. Sometimes, though, an appreciable lag will be necessary and the material will be selected to suit the particular conditions at hand.

Subjacent the bimetallic element is a pair of switch arms 34 and 36, at least the lower of which is resilient. Each of the switch arms carries a cooperable contact 38, 40. Next to the fixed ends of the switch arms 34 and 36 are terminals 42 and 44 which are connected in circuit with the resistance element 20 of the heating unit 16 by means of conductors 46, 48 and 50. In actual practice the conductors 48 and 50 would be designated in such fashion that they could be terminally connected directly to a conventional household electrical outlet or power source.

As already mentioned, the bimetallic element 26 is mounted in a cantilever fashion, as are also the switch arms 34 and 36, and aiding in this mounting is a plurality of insulating blocks or washers 52, 54 and 56, these washers being retained in a stacked condition by bolt or rivet means not visible in the views now under discussion.

Through the medium of a stud 58 of insulating material mounted on an extension of the lower arm 36, the contacts 38 and 40 are separated by deflective action of the bimetallic element in a manner more fully explained below.

Having in mind the construction and arrangement of the principal elements thereof set forth in Figures 1, 2, 3 and 4, it is believed that a fundamental understanding of the invention may be had from a description of the operation involving the aforedescribed embodiment. Assuming that the conductors 48 and 50 are connected to an appropriate power source, flow of electrical current will take place via the closed contacts 38 and 40 and the heating unit 16 in series therewith. Energization of the heating unit 16 will cause the temperature of the vessel 10 and its contents to rise, and heat radiated downwardly to the bimetallic element 26 will result in a progressive upward deflection of this element which deflection will ultimately urge the metallic stud 32 against the bottom of the vessel 10. Comparison of Figures 1 and 3 will demonstrate the change that has occurred thus far.

Actual engagement or contact of the stud 32 with the vessel 10 does two things: First, it establishes a heat conductive path between the vessel 10 and the bimetallic element 26 by way of the stud 32 which did not originally exist in the cool condition of the appliance. (Note the slight spacing in Figure 1.) Secondly, the stud 32 precludes further upward movement of the free end of the bimetallic element 26. What happens is that continued receipt of heat (now by conduction and radiation) creates additional deflective forces within the bimetal. However, as can be seen from Figure 3, neither end of the bimetallic element can move in a direction to relieve these thermal stresses, although the middle portion can—but in a downward direction. Bowing of the bimetallic element downwardly results in the middle portion thereof engaging the stud 58, as depicted in Figure 4, with the consequence that the stud 58 is urged downwardly to separate the contact 40 from the contact 38, thus interrupting the flow of power to the heating unit 16.

De-energization of the heating unit 16 will inaugurate a cooling period and the thermostat 24 will return to the position pictured in Figure 3, that is the contacts 38 and 40 will be permitted to close since the switch arm 36 is biased upwardly. Closure of the switch contacts will immediately re-energize the heating unit 16. However, it will be noticed that this action takes place before the bimetal 26 has cooled sufficiently to cause separation of the metallic stud 32 from the bottom of the vessel 10. Hence, heat will continue to be transmitted through the stud 32, as well as by radiation from the vessel's bottom, to the bimetal. After the heating unit 16 has been energized for a sufficient length of time the thermostat 24 will return to the condition shown in Figure 4, occasioning the opening of the contacts 38 and 40 for the second time. From the foregoing it is believed manifest that the thermostat 24 will cycle between the two positions illustrated in Figures 3 and 4. Since the flow of heat to the bimetallic element 26 is facilitated, compared to that in Figure 1, the vessel 10 is maintained at a lower heat than it was originally raised to in order to effect the first change from Figure 1 to Figure 4. Stated somewhat differently, it does not take as much heat to go from the position in Figure 3 to that in Figure 4 as it does from Figure 1 to Figure 4 (by way of Figure 3). Owing to the intermittent energization of the heating unit 16, in contrast to its earlier prolonged energization, the requirement that less heat be furnished is realized.

Figure 5:
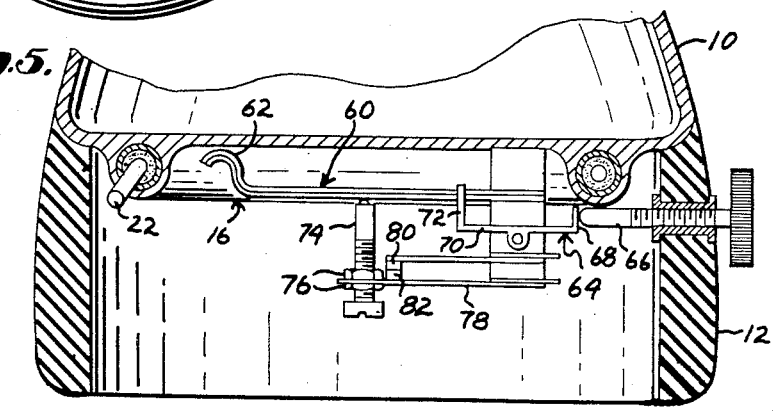
Figure 5 is a view corresponding in general substance to the arrangement shown in Figure 1 but incorporating thereinto certain adjustment means.

Passing now to a description of Figure 5, there is presented a modified bimetallic element labelled 60 having an offset arcuate free end 62. In this instance, though, the bimetallic element is self-biased upwardly, as by sufficient original deformation, and is restrained or pulled downwardly about its anchored end by an adjusting mechanism designated generally by the reference numeral 64. The adjusting mechanism includes a screw 66 threadedly mounted for advancement against one end 68 of a pivotal lever member 70. The other end 72 of the lever 70 is configured to overlie or straddle at least partially a portion of the upper side of the element 60. Advancement of the adjusting screw 66 against the lever end 68 causes a downward movement of the end 72, thereby overcoming the upward bias of the bimetallic element 60. The degree of screw advancement will obviously determine the distance the bimetal end 62 is spaced from the underside of the vessel 10.

Another adjusting screw 74 is carried at the free end of the switch arm 36, corresponding in function to the hereinbefore mentioned stud 58. By means of a pair of locking nuts 76 the screw 74 may be retained in a preferred relation with respect to the bimetal 60. A pair of normally closed contacts 80 and 82 are in circuit with the heating unit 16, corresponding to the previously described contacts 38 and 40. The contact 82 is disposed on the same resilient switch arm 78 to which the screw 74 is attached.

Figure 1:
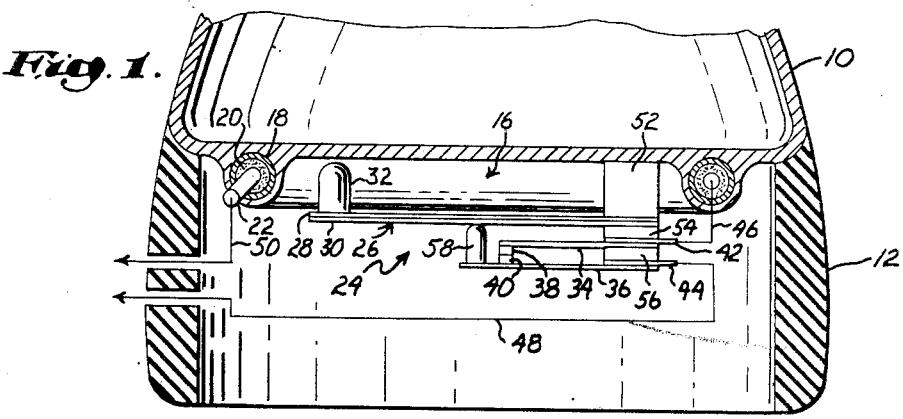
Figure 1 is a fragmentary elevational view, primarily in section, taken in the direction of line 1—1 of Figure 2 illustrating one embodiment.
Figure 2:
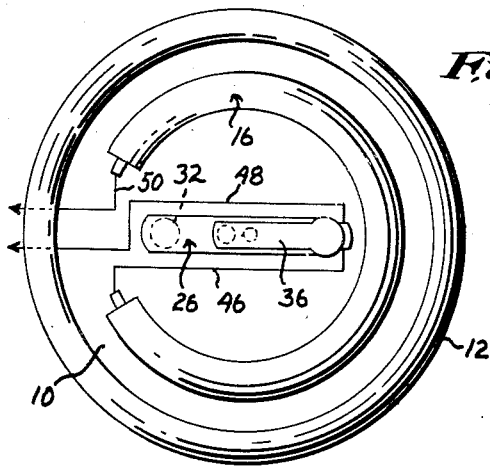
Figure 2 is a bottom plan view of the arrangement pictured in Figure 1.

In the operation of the embodiment pictorially presented in Figure 5 the arcuate bimetal end 62 acts in a manner analogous to the stud 32 of Figure 1, serving as the means by which heat is conducted into the bimetallic element 60 after a predetermined upward deflection has occurred. The amount of radiated heat needed to cause contact of the end 62 with the vessel 10 is governed by the position into which the screw 66 has been rotated.

Depending upon the relative advancement of the screw 74, the amount of downward bowing of the bimetallic element 60 necessary to open the contacts 80 and 82 is controlled, such downward bowing happening of course after the above-described contact of the end 62 with the vessel 10 has occurred.

When applied to coffeemakers, it will be appreciated that, although strictly speaking the effects of the two adjustments are not completely independent of each other, the screw 66 predominantly governs the brewing period and the screw 74 predominantly the warming temperature. This follows from the fact that the adjusting mechanism 64 determines at what temperature the arcuate end 62 engages the vessel 10 to establish both a simultaneous conductive path and fulcrum point between the bimetal 60 and said vessel. Of course the switch contacts 80, 82 do not at this time open, for the bimetallic element 60 has yet to bow downwardly to force these contacts apart via the medium of the screw 74. However, this downward bowing transpires at a relatively rapid pace, due to the addition of heat by conduction at the higher temperature condition, together with continued heat by radiation. Once the contacts 80, 82 have remained separated for a sufficient length of time (and the heating unit 16 deenergized) the vessel 10 will cool until the bimetal has straightened enough to permit closing of the contacts 80, 82. This is where the screw 74 serves its intended purpose, because its particular setting will determine to a considerable extent at what degree of return of the bimetal's mid-portion in the direction of the vessel will be necessary to permit contact closure. Hence, by adjusting the screw 74 the desired warming temperature can be achieved for any given setting of the screw 66. Depending upon design factors, the screw 74 can in most instances be factory adjusted, leaving only the adjustment 64 for the user to manipulate for a preferred coffee strength.

By having the bimetal 60 biased in the direction of the vessel 10, a reheat of the vessel's contents is made possible. To accomplish the reheat, the screw 66 need only be retracted sufficiently so as to permit relaxation of the downward pressural action exerted by the lever 70. Having removed this downward pull, the bimetal 60 flexes upwardly (due to the previously explained deformation), bringing its end 62 into immediate contact with the vessel's underside without passing through the initial high heat period. With the end 62 touching the vessel, the bimetal bows downwardly, receiving heat by conduction as well as by radiation, until the contacts 80, 82 are separated by the engagement of the center portion of the bimetal with the upper end of the screw 74. The contacts will close after the vessel has cooled sufficiently. In this way a repetitive cycle is obtained, but involving only a lower warming temperature, not the initial high heat.

In Figure 6 there is shown a bimetallic element 84, much like the bimetal 26 of Figure 1, only the element 84 is disposed so as to underlie a different adjustment mechanism 86, corresponding in function to that designated 64 in Figure 5. The mechanism 84 is designed so as to produce a variable gap between the bottom of the vessel 10 and the free end of the bimetal 84. Aiding in the achievement of this aim, though not in any way essential, is a strap or bar 87 that can be brazed to the vessel's underside, and carried by this strap is a depending threaded stud 88. In threaded engagement with the stud 88 is an internally threaded bushing 90, press fitted into a plastic dial 92 of sufficient diameter so as to have a segment of the dial's circumference projecting through the base 12 to permit facile external adjustment.

Except for the use of the adjustment mechanism 86, the arrangement depicted in Figure 6 functions in the same manner as the earlier described embodiments. By retracting or moving the bushing 90 downwardly by means of the dial 92 the gap between the closed end of the bushing 90 and the free end of the bimetal 84 is diminished, and the bimetallic element 84, due to heat received by radiation from the vessel, deflects upwardly to produce contact between the bimetal end and the bushing sooner than when a larger gap prevails. Hence, the high heat period is terminated earlier, since when the free bimetal end strikes the bushing 90 this extremity acts as a fulcrum to inaugurate the downward bowing of the bimetal's mid-portion, just as hereinbefore, to open the contacts 94, 96. In this regard, it will be understood that the heat conductive path extends to the bimetal 84 via the strap 87, the stud 88 and the bushing 90. Along this line, it might also be explained that if a reheat without a high initial heat is desired, then the dial 92 is rotated until the bushing 90 closes the gap between said bushing and the free end of the bimetal.

Perhaps for most purposes the modification pictured in Figures 7, 8 and 9 will be the most preferred, largely because it permits the employment of a bimetallic element 100 having a more effective length and hence capable of greater deflective magnitudes. Accordingly, it will be seen that the bimetallic element 100 is substantially U-shaped, being composed of a metallic strip 102 having a relatively low coefficient of expansion and a metallic strip 104 having a relatively high coefficient, the shorter leg of the element having a free end 106 disposed for engagement with the extended end of a lower switch arm 108 carrying suitable insulation 110 and a contact 112. The contact 112 is cooperable with another contact 114 mounted on an upper arm 116. The upper arm 116 is biased toward the lower arm, the biasing action being controlled by an adjusting screw 118 threadedly engaged with a horizontal bracket 120. Consequently, the free end 106 will cause separation of the contacts 112, 114 at a point influenced by the setting of the screw 118.

The upper leg of the bimetal 100 is anchored at one end to produce the desired cantilever action and carries at a locus adjacent its bight region an upstanding heat conductive stud 122 similar to the stud 32 of Figure 1. As with the bimetallic element 60 the upper leg of the element 100 is biased upwardly. However, in the illustrated instance the biasing action is controlled by means of an adjustment mechanism generally indicated by the numeral 124 and including a slide member 126 having a shoe 128 attached to one end thereof, the shoe bearing against the upper side of the upper bimetallic leg to counteract various amounts of bias. The member 126 straddles a bolt or rod 130 by reason of a longitudinal slot 132 therein. It might be explained that the bolt or rod 130 (or similar means) is utilized in each of the depicted embodiments, but since it has been unimportant up to this point to an understanding of any aspect of the invention, it simply has not been made visible. Also included in the mechanism 124 is a screw 134 having threaded engagement with a downturned end of the member 126, the screw 134 being journaled in a sleeve 136 and having a knob 138 by which the mechanism may be adjusted in an easy manner.

While it is thought that the operation of the embodiment now under discussion will be readily understood from the foregoing description, especially when taken in conjunction with the other exemplified constructions that the invention may assume, nonetheless a brief outline of the operation pertaining directly to the arrangement depicted in Figures 7, 8 and 9 should prove of benefit. Having adjusted the mechanism 124 to the position shown in Figure 7 and having plugged the heating unit 16 into a power outlet, heat will be radiated downwardly to the upper leg of the bimetal 100. This will raise the temperature of the bimetal so that the upper leg moves upwardly together with the stud 122, pivoting in a sense about the shoe 128, while the lower leg deflects downwardly to a lesser extent, occasioned by the partial distribution of heat throughout the bimetal plus the fact that the more expansive metal 104 is uppermost as far as the lower leg is concerned.

In any event, the stud 122 ultimately touches the undersurface of the vessel 10 (Figure 8) to establish both a heat conductive path to the bimetal from the vessel and a fulcrum point with respect to which the free end 106 partially revolves until it reaches the position illustrated in Figure 9. Such action results in the contacts 112, 114 being urged apart by the engagement of said free end 106 with the insulated end of the lower arm 108.

Once the contacts 112, 114 have separated, the heating unit 16 will be de-energized and the bimetal 100 will return to substantially the relation depicted in Figure 8, since the vessel 10 will be cooling during this period and both radiated and conducted heat delivered to the element 100 will of course decrease. However, when the contacts 112, 114 close, the heating unit 16 will be re-energized until the bimetal 100 again deflects to the position shown in Figure 9. In this way the lower or warming heat is realized, for the heating unit 16 is not kept energized for a period as long as the original one and the high heat portion of the cycle is not repeated.

If the slide member 126 is moved far enough to the right, as viewed in Figure 7, it will be appreciated that the self-biasing of the bimetallic element 100 will dominate to such an extent that the stud 122 will contact the vessel 10 without assistance from any thermal action. It is in this fashion that the reheating of the vessel 10 is achieved without going through the initial high heat period.

Although the various contact arms presented in connection with the several embodiments have been shown only as resilient strips, it will be understood by those familiar with the thermal switch art that snap acting arms of varied constructions might be desired in a number of installations, especially if the bimetallic member is made quite short or relatively thick.

As many changes could be made in the above constructions and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Now, therefore, I claim:

1. An electrically heated device comprising a member to be heated, an electric heating unit for supplying heat to said member, a pair of switch contacts in circuit with said heating unit, a single bimetallic element mounted in cantilever fashion for deflective movement toward said member upon receipt of sufficient radiated heat from said member, and fulcrum means disposed between a portion of the bimetallic element and said member for arresting deflective movement of said element, whereby additional heat received by the bimetallic element is instrumental in producing deflection of said element in a direction to open said switch contacts.

2. An electrically heated device comprising a member to be heated, an electric heating unit for supplying heat to said member, a pair of switch contacts in circuit with said heating unit, a single bimetallic element mounted in cantilever fashion for deflective movement toward said member upon receipt of sufficient radiated heat from said member, and heat conductive transfer means disposed between a portion of the bimetallic element and said member for arresting deflective movement of said element and to add by conduction to said bimetallic element heat from said member, whereby the total heat intorduced to the bimetallic element is instrumental in producing a modified deflection of said element in a direction to open said switch contacts.

3. An electrically heated device comprising a member to be heated, an electrical heating unit for supplying heat to said member, a pair of switch contacts in circuit with said heating unit, a single bimetallic element mounted in cantilever fashion for deflective movement relative to said member, sufficient deflective movement due to heat radiated from said member causing a remote portion of said bimetallic element to come into a heat conductive and physically arrested relationship with respect to said member, said remote portion then serving as a fulcrum point about which further deflective action can occur to cause another portion of the bimetallic element to actuate said switch contacts.

4. An electrically heated vessel comprising an electric heating unit for supplying heat to the vessel, a pair of cooperable contacts in circuit with the heating unit and biased to closed position, a single bimetallic element fixedly mounted at one end with respect to the vessel and having a portion thereof spaced from said one end biased into a heat conductive relationship with the vessel, adjustment means engageable with the bimetallic element intermediate said one end and said spaced portion for overcoming the bias of the bimetallic element to render said element responsive to heat radiated from the vessel, sufficient radiated heat being capable of establishing a heat conductive path with the vessel and said vessel acting to restrain said spaced portion so that another portion of the bimetallic element is caused to move in a direction to overcome the bias of said switch contacts and thus separate them.

5. An electrically heated vessel comprising an electrical heating unit for supplying heat to the vessel, a pair of cooperable switch contacts in circuit with the heating unit, a single bimetallic element mounted so as to receive heat by radiation in one position and by radiation plus conduction in a second position, the vessel restraining a selected portion of the bimetallic element in its second position so that a second selected portion thereof is caused to move in a direction to actuate said switch contacts.

6. An electrically heated device comprising a member to be heated, an electrical heating unit for supplying heat to said member, a pair of cooperable switch contacts in circuit with the heating unit, a single bimetallic element responsive to the temperature of said member having one portion thereof movable between first and second positions, said second position being at a higher temperature than the first, and means restraining said one portion from movement beyond said second position so that a second portion of the bimetallic element spaced from said first portion is caused to move in a direction to actuate said switch contacts.

7. An electrically heated vessel comprising an electrical heating unit for supplying heat to one section of the vessel, a pair of cooperable switch contacts in circuit with the heating unit, a single bimetallic element mounted in cantilever fashion to receive heat initially by radiation from another section of the vessel, deflection of the bimetallic member from its radiation receiving position bringing a portion of the bimetallic element into a heat conductive and arrestive relationship with the vessel so that another portion of the bimetallic member is caused to deflect in a direction to separate said switch contacts.

8. An electrically heated vessel comprising an electric heating unit for supplying heat to the vessel, a pair of cooperable switch contacts in circuit with the heating unit and biased to closed position, a single bimetallic element spaced from the vessel so as to receive heat first by radiation through the intervening air medium, heat so received causing deflection of the bimetallic element toward the vessel, means for adding heat by conduction to the bimetallic element to increase the heat thereof after a predetermined amount of deflection has occurred, and the vessel having means for preventing further deflection of the bimetallic element toward the vessel with at least a portion of said bimetallic element being free to deflect in a direction away from the vessel to open said switch contacts.

9. An electrically heated device comprising a member to be heated, an electric heating unit for supplying heat to said member, a pair of cooperable switch contacts in circuit with said heating unit, a single bimetallic element anchored at one end, said bimetallic element being disposed in relation to said member so as to deflect from a lower temperature position to a higher temperature position, and means arresting further deflective movement of a portion of said bimetallic element, said portion being spaced from said anchored end, whereby another portion of said bimetallic element is caused to deflect in a direction to actuate said contacts.

10. An electrically heated device comprising a member to be heated, an electric heating unit for supplying heat to said member, a pair of cooperable switch contacts in circuit with said heating unit, a single bimetallic element responsive to the temperature of said member, said element being mounted for movement from a first heat receiving position spaced from said member to a second heat receiving position nearer said member, and means resisting further movement of said bimetallic element beyond its second position, whereby a portion of said bimetallic element is caused to move in a direction to actuate said contacts.

11. An electrically heated device comprising a member to be heated, an electric heating unit for supplying heat to said member, a pair of cooperable switch contacts in circuit with said heating unit, and a single bimetallic element mounted in cantilever fashion having offset heat conductive means at its free end disposed for abutment against said member after sufficient deflection of said element, said heat conductive means in its abutting position providing a fulcrum point to cause a mid-portion of the bimetallic element to bow in a direction to separate said contacts.

12. An electrically heated device in accordance with claim 11 in which the free end of the bimetallic element is biased in the direction of the member to be heated, the device including an adjustment mechanism for overcoming the bias to a preferred extent.

13. An electrically heated device comprising a member to be heated, an electric heating unit for supplying heat to said member, a pair of cooperable switch contacts in circuit with said heating unit, a single bimetallic element mounted in cantilever fashion for deflective movement relative to said member, and heat conductive, interengaging threaded means carried by said member for producing a desired gap with respect to a remote portion of said bimetallic element and a fulcrum point when the bimetallic element has deflected sufficiently due to heat radiated from said member, whereby additional heat received by radiation and conduction is instrumental in producing deflection of said element in a direction to open said switch contacts.

14. An electrically heated vessel comprising an electric heating unit for supplying heat to the vessel, a pair of cooperable contacts in circuit with the heating unit and biased to closed position, a single bimetallic element mounted in cantilever fashion at one end and having its other end substantially U-shaped, and heat conductive means disposed between a portion of the bimetallic element in the region of said U-shaped end and said member, said heat conductive means serving as a fulcrum point after the bimetallic element has deflected sufficiently due to heat radiated from said member to said element, whereby the free extremity of said U-shaped end is constrained to move in a direction to open said contacts by reason of heat received by continued radiation and by way of heat conducted via said heat conductive means.

15. An electrically heated device comprising a member to be heated, an electric heating unit for supplying heat to said member, a pair of cooperable contacts in circuit with said heating unit, a bimetallic element having a longer leg, a shorter leg and an interconnecting bight therebetween, the bimetallic element being composed of an outer strip of metal having a relatively high coefficient of thermal expansion and an inner strip of metal having a relatively low coefficient of thermal expansion, means mounting the end of said longer leg remote from said bight in a cantilever fashion so that its relatively high coefficient strip portion faces said member but is spaced therefrom, heat conductive means disposed between the end of the longer leg lying adjacent the bight and said member, said heat conductive means serving as a fulcrum point after the longer leg has deflected sufficiently toward said member due to heat radiated from said member to establish a heat conductive path via said heat conductive means, whereby heat transferred to said bimetallic element by radiation and conduction is instrumental in causing the end of the shorter leg remote from said bight to rotate with respect to said heat conductive means in a direction away from said member, and means carrying one of said contacts having a portion thereof disposed in the path of said last mentioned end so that said one contact is separated from the other.

16. An electrically heated device in accordance with claim 15 in which the longer bimetallic leg is biased in the direction of the member to be heated, the device including an adjustment mechanism for overcoming the bias to a preferred extent.

17. An electrically heated vessel comprising an electric heating unit for supplying heat to one section of the vessel, a pair of contact arms supported at one end and each carrying a contact cooperable with the other, said contacts being in circuit with said heating unit, a bimetallic element having a longer leg, a shorter leg and an interconnecting bight therebetween, the bimetallic element being composed of an outer strip of metal having a relatively high coefficient of thermal expansion and an inner strip of metal having a relatively low coefficient of thermal expansion, means counting the end of said longer leg remote from said bight in a cantilever fashion so that its relatively high coefficient strip portion faces said vessel but is spaced therefrom, a metallic stud carried by the longer leg adjacent the bight and engageable with another section of the vessel after the longer leg has deflected sufficiently toward said vessel due to heat radiated therefrom to establish both a fulcrum point and a heat conductive path, one of said contact arms being resilient and provided with an extension whereby said contacts are separated by reason of engagement with said extension by the end of the shorter leg remote from said bight as it swings due to heat transmitted to said bimetallic element by radiation and conduction.

18. An electrically heated device comprising a member to be heated, an electric heating unit for supplying heat to said member, a single bimetallic element mounted in cantilever fashion for deflective movement relative to said member upon receipt of sufficient radicated heat from said member, fulcrum means disposed between one portion of the bimetallic element and said member for arresting deflective movement of said element in one direction whereby additional heat received by the bimetallic element is instrumental in producing deflection of a second portion of said element in a direction substantially opposite to said one direction, and a pair of switch contacts one of which is mounted so as to be actuated by said second portion of the bimetallic element into an open position with respect to the other contact.

19. An electrically heated device in accordance with claim 18 including a resilient switch arm on which said one contact is mounted, said switch arm having an upstanding stud engageable by said second bimetallic portion.

20. An electrically heated device in accordance with claim 19 in which said second portion is a section of said bimetallic element having a maximum amount of deflection in said opposite direction.

References Cited in the file of this patent

UNITED STATES PATENTS

| | | |
|---|---|---|
| 1,232,458 | Cavanaugh | July 3, 1917 |
| 1,916,669 | Kuhn | July 4, 1933 |
| 2,140,479 | Myers | Dec. 13, 1938 |
| 2,254,687 | Koci | Sept. 2, 1941 |
| 2,271,485 | Koci | Jan. 27, 1942 |
| 2,273,375 | Ray | Feb. 17, 1942 |
| 2,422,974 | Newell | June 24, 1947 |
| 2,622,186 | Hutchens | Dec. 16, 1952 |
| 2,656,441 | Slatkin | Oct. 20, 1953 |